United States Patent [19]

Iwafune

[11] Patent Number: 4,641,206
[45] Date of Patent: Feb. 3, 1987

[54] VIDEO SIGNAL RECORDING AND REPRODUCING APPARATUS INCLUDING A NOISE REDUCTION CIRCUIT

[75] Inventor: Kasuke Iwafune, Yamato, Japan

[73] Assignee: Victor Company of Japan, Ltd., Yokohama, Japan

[21] Appl. No.: 584,736

[22] Filed: Feb. 29, 1984

[30] Foreign Application Priority Data

Mar. 1, 1983 [JP] Japan .................... 58-34126

[51] Int. Cl.[4] ............................................. H04N 5/78
[52] U.S. Cl. .................................. 360/33.1; 360/38.1; 360/24
[58] Field of Search ................... 360/33.1, 38.1, 24; 358/327, 328, 329, 336, 340, 36; 307/455

[56] References Cited

U.S. PATENT DOCUMENTS

| | | | |
|---|---|---|---|
| 4,041,326 | 8/1977 | Robinson | 307/455 X |
| 4,302,768 | 11/1981 | Kamura et al. | 358/36 |
| 4,524,380 | 6/1985 | Shibata et al. | 358/329 X |

FOREIGN PATENT DOCUMENTS

| | | |
|---|---|---|
| 2316540 | 10/1973 | Fed. Rep. of Germany. |
| 2917022 | 11/1979 | Fed. Rep. of Germany. |
| 2094092 | 9/1982 | United Kingdom ............... 358/329 |

*Primary Examiner*—Aristotelis M. Psitos
*Attorney, Agent, or Firm*—Michael N. Meller

[57] ABSTRACT

A video signal recording and reproducing apparatus comprises a circuit for recording an FM recording video signal onto a recording medium, a demodulator for reproducing and demodulating the recorded signal from the recording medium back into the original video signal, a noise reduction circuit for reducing a noise component in the reproduced video signal. The noise reduction circuit has a first delay circuit for delaying the reproduced video signal by one horizontal scanning period (1H), a first differential amplifier supplied with the reproduced video signal and with a 1H delayed reproduced video signal, a first limiter for amplitude-limiting an output of the first differential amplifier, and a subtracting circuit for performing a subtraction between the reproduced video signal and an output of the first limiter. The apparatus further comprises a second differential amplifier supplied with the recording video signal to one input thereof, a second delay circuit for delaying the recording video signal by 1H and for supply a 1H delayed recording video signal to another input of the second differential amplifier, a second limiter for amplitude-limiting an output video signal component of the second differential amplifier to a limiting level approximately in the same range as a limiting level of the first limiter, and an adding and mixing circuit for adding and mixing an output video signal component of the second limiter to the recording video signal.

3 Claims, 4 Drawing Figures

VIDEO SIGNAL RECORDING AND REPRODUCING APPARATUS INCLUDING A NOISE REDUCTION CIRCUIT

BACKGROUND OF THE INVENTION

The present invention generally relates to video signal recording and reproducing apparatuses including a noise reduction circuit, and more particularly to a video signal recording and reproducing apparatus which carries out recording and reproduction so that, a reproduced video signal obtained through a noise reduction circuit which reduces a noise component in the reproduced video signal by using line correlations, includes a video signal component which has no line correlation and has a level of a range approximately equal to the range of the level of a video signal component which has no line correlation and is included within an original video signal.

Generally, a video signal recording and reproducing apparatus, such as a video tape recorder, is designed to obtain a reproduced video signal through a noise reduction circuit which is located in a reproducing system. The noise reduction circuit reduces a noise component which is mixed into the reproduced video signal during the reproducing process of the video signal. As is well known, there are the so-called line correlations in the video signal. In other words, video information contents of mutually adjacent horizontal scanning lines are extremely similar to each other. That is, a line correlation exists between the video information contents with an interval of one horizontal scanning period (1H). On the other hand, there is no line correlation in the noise component because the noise component is generated at random. Accordingly, the above noise reduction circuit uses the line correlations in the video signal and obtains the noise component by delaying the reproduced video signal by 1H, and by passing the reproduced video signal and the delayed reproduced video signal through a differential amplifier.

A subtraction is then performed in a subtracting circuit, between the noise component from the differential amplifier and the reproduced video signal, so as to cancel the noise component within the reproduced video signal.

However, not all of the video information have the line correlation. For example, a video information related to a line which extends in a direction other than the vertical direction of the picture and a video information related to a rapidly moving picture do not have the line correlation. Hence, in addition to the noise component, the output signal of the differential amplifier in the above noise reduction circuit also includes the video signal component which has no line correlation. As a result, the subtracting circuit within the noise reduction circuit will also perform a subtraction between the video signal component which has no line correlation and is included within the reproduced video signal and the video signal component which has no line correlation and is included within the output signal of the differential amplifier. For this reason, in order to further improve the signal-to-noise (S/N) ratio of the reproduced video signal, a limiting level for the output signal of the differential amplifier which is supplied to the subtracting circuit will have to be increased. However, if the limiting level for the output signal of the differential amplifier is increased, the video signal component which has no line correlation will also be greatly reduced. Consequently, the blur or unclearness around the contours of the displayed contents in the reproduced picture will become visually conspicuous. Therefore, it was impossible to sufficiently improve the S/N ratio of the reproduced video signal in the conventional video signal recording and reproducing apparatus.

SUMMARY OF THE INVENTION

Accordingly, it is a general object of the present invention to provide a novel and useful video signal recording and reproducing apparatus including a noise reduction circuit, in which the above described problems have been eliminated.

Another and more specific object of the present invention is to provide a video signal recording and reproducing apparatus in which, at the time of the recording, input and output signals of a delay circuit, which delays a recording video signal which is to be recorded by one horizontal scanning period, are passed through a differential amplifier, an output signal of the differential amplifier is added and mixed to the recording video signal, with the level of this output signal set approximately the same as an output level of a limiter within a noise reduction circuit which reduces noise in a reproduced video signal at the time of the reproduction if this output signal of the differential amplifier were passed through the limiter, and the added and mixed signal is frequency-modulated and recorded onto a recording medium. According to the apparatus of the present invention, it is possible to carry out the recording by adding a video signal component which has no line correlation and has a predetermined level, to the recording video signal. Hence, at the time of the reproduction, even when the reproduced video signal is passed through a noise reduction circuit which uses the line correlation to reduce the noise, the video signal component which has no line correlation and is included within the reproduced video signal, can be reproduced with a level which is approximately the same as the level of the video signal component which has no line correlation and is included within the recording video signal. Thus, compared to the reproduced picture obtained in the conventional video signal recording and reproducing apparatus, the contours of the displayed contents in the reproduced picture which is obtained according to the apparatus of the present invention are sharp and clear, because the video signal component which has no line correlation and is included within the recording video signal can be reproduced satisfactorily. In addition, according to the apparatus of the present invention, it is possible to improve the signal-to-noise ratio of the reproduced video signal.

Still another object of the present invention is to provide a video signal recording and reproducing apparatus in which a delay circuit and a differential amplifier, constituting a noise reduction circuit which is supplied with a reproduced video signal, are also used at the time of the recording, and a signal obtained by inverting the phase of an output signal of the differential amplifier and a recording video signal which is to be recorded are added and mixed at the time of the recording. According to the apparatus of the present invention, the same differential amplifier and the same delay circuit can be used at the time of the recording and at the time of the reproduction. Hence, the number of circuit parts which are required and the manufacturing cost of the apparatus can both be reduced, and it is possible to simplify the circuit construction of the apparatus.

A further object of the present invention is to provide a video signal recording and reproducing apparatus in which a delay circuit, for producing a video signal which is to be used as a reproduced video signal when a dropout occurs, is also used as a delay circuit which is used at the time of the recording. According to the apparatus of the present invention, it is possible to greatly simplify the circuit construction of the apparatus.

Other objects and further features of the present invention will be apparent from the following detailed description when read in conjunction with the accompanying drawings.

DETAILED DESCRIPTION

Figure 1:
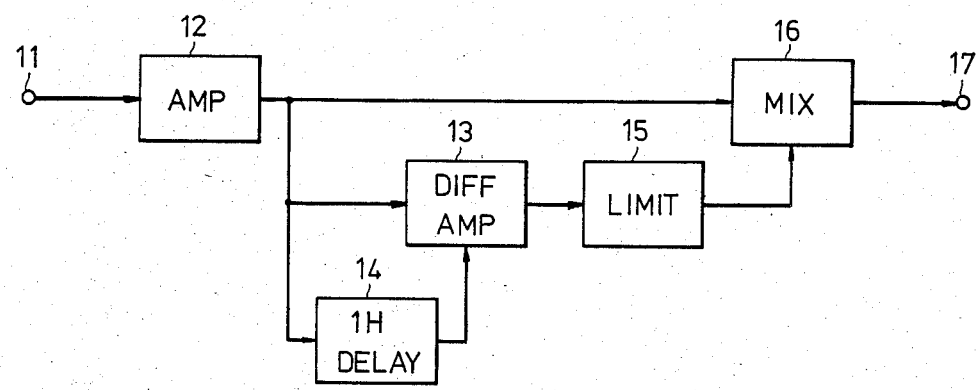
FIG. 1 is a systematic block diagram showing an example of a noise reduction circuit within a conventional video signal recording and reproducing apparatus.

Before describing the video signal recording and reproducing apparatus according to the present invention, description will first be given with respect to a conventional video signal recording and reproducing apparatus. In FIG. 1, a reproduced video signal from a frequency demodulator (not shown), which frequency-demodulates a frequency modulated signal which is reproduced from a recording medium (not shown), is applied to an input terminal 11. This reproduced video signal is passed through an amplifier 12. An output signal of the amplifier 12 is directly supplied to a first input terminal of a differential amplifier 13, and to a 1H delay circuit 14 for delaying the signal by one horizontal scanning period (1H). An output signal of the 1H delay circuit 14 is supplied to a second input terminal of the differential amplifier 13. When a differential amplification is performed in the differential amplifier 13, between the reproduced video signals which have the 1H time difference, a signal produced from the differential amplifier 13 normally includes a noise component within the reproduced video signal and a video signal component of a small level which has no line correlation and is included within the reproduced video signal, as described before. These signal components in the output signal of the differential amplifier 13 are amplitude-limited in a limiter 15 and then supplied to a mixer 16.

The mixer 16 mixes the reproduced video signal from the amplifier 12 and the output signal of the limiter 15, and produces a signal in which the noise component in the reproduced video signal is eliminated, by cancelling the noise component in the reproduced video signal which is obtained from the amplifier 12 by the noise component which is obtained from the limiter 15. The output signal of the mixer 16 is produced through an output terminal 17. Hence, a reproduced video signal which has been reduced of the noise component, is obtained through the output terminal 17.

However, according to the noise reduction circuit in the conventional apparatus, the video signal component which has no line correlation and is included within the reproduced video signal, is also cancelled by the video signal component which has no line correlation and is included within the output signal of the limiter, in the mixer 16. As a result, a blur or unclearness will exist around the contours of the displayed contents in the reproduced picture which is obtained from the reproduced video signal. For this reason, it was impossible to satisfactorily improve the signal-to-noise ratio (S/N) of the reproduced video signal in the conventional apparatus.

Thus, according to the present invention, the video signal component which has no line correlation is recorded with its level amplified, in order to eliminate the problems of the conventional apparatus described above. Description will now be given with respect to an embodiment of the video signal recording and reproducing apparatus according to the present invention, by referring to FIG. 2.

Figure 2:
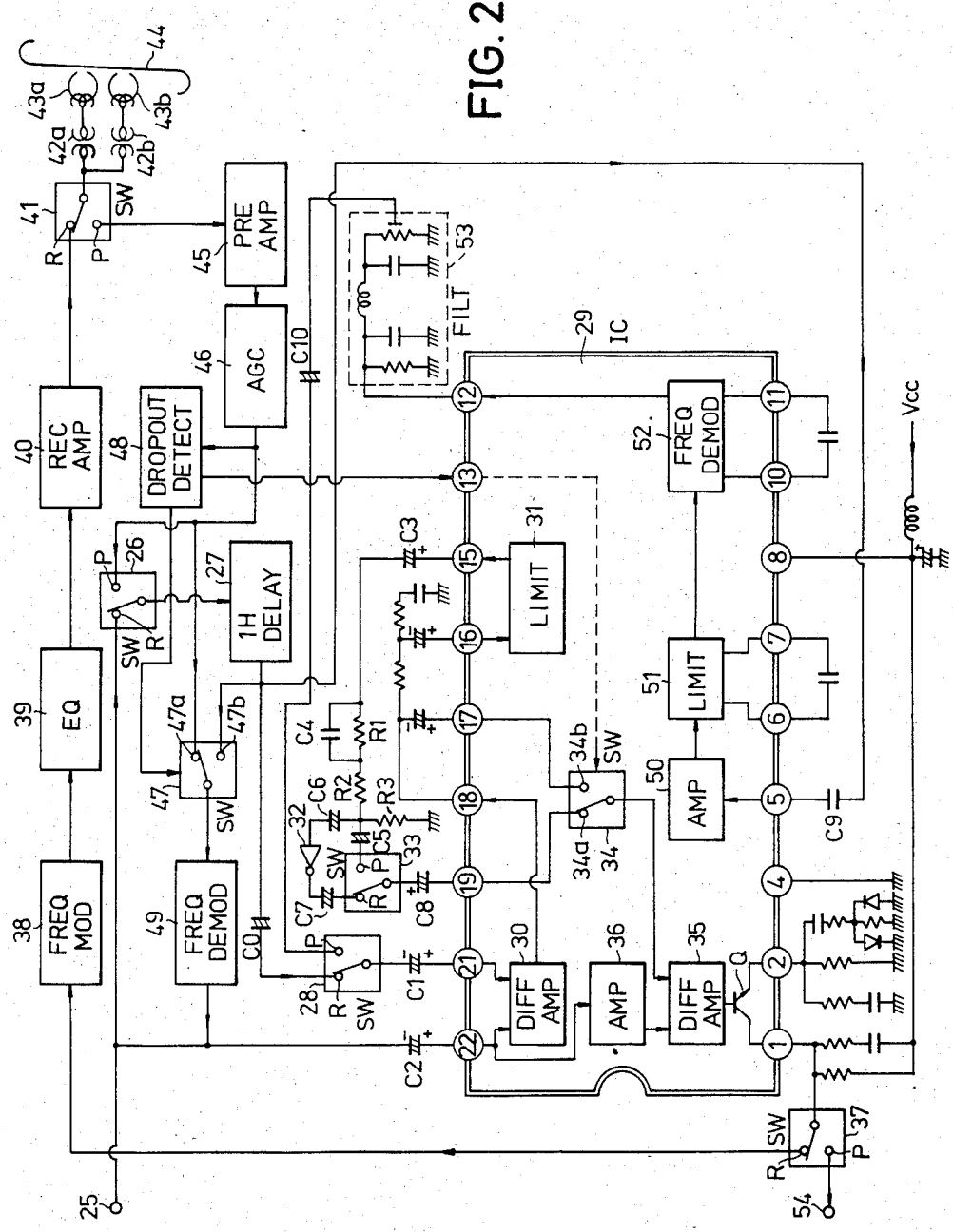
FIG. 2 is a systematic circuit diagram showing an embodiment of a video signal recording and reproducing apparatus according to the present invention.

First, description will be given with respect to the operation of the apparatus at the time of the recording. In FIG. 2, a recording video signal which is to be recorded, is applied to an input terminal 25. This recording video signal is passed through a switching circuit 26 which is connected to a terminal R, and is supplied to a 1H delay circuit 27 wherein the signal is delayed by 1H. An output signal of the 1H delay circuit 27 is passed through a capacitor C0, a switching circuit 28 which is connected to a terminal R, and a D.C. blocking capacitor C1, and is then supplied to a pin No. 21 of an integrated circuit (IC) 29. A differential amplifier 30 within the IC 29 differentially amplifies the recording video signal which is supplied to a pin No. 22 of the IC 29 through the input terminal 25 and a capacitor C2, and the recording video signal which is supplied to the pin No. 21 through the signal path including the switching circuit 26, the 1H delay circuit 27, the capacitor C0, the switching circuit 28, and the capacitor C1. In other words, the recording video signal which is supplied to the pin No. 21, is a signal which has been delayed by 1H in the 1H delay circuit 27.

The recording video signal which is applied to the input terminal 25, does not include a noise component. In addition, the recording video signal which is obtained through the 1H delay circuit 27, includes substantially no noise component. The noise component which is to be reduced in the noise reduction circuit at the time of the reproduction, is mainly mixed into the video signal through the magnetic recording and reproducing path. Accordingly, at the time of the recording, only the video signal component which has no line correlation and is included within the recording video signal, is obtained at the output of the differential amplifier 30. In other words, a noise component is in principle not included in the output signal of the differential amplifier 30 at the time of the recording. This video signal component which has no line correlation and is obtained from the differential amplifier 30, is produced through a No. 18 pin of the IC 29. The video signal component which is produced through the No. 18 pin of the IC 29, is passed through a circuit made up of capacitors and resistors, and is applied to a No. 16 pin of the IC 29. The signal which is applied to the No. 16 pin of the IC 29, is supplied to a limiter 31 wherein the signal is amplitude-limited. Obviously, the amplitude of the video signal component which has no line correlation and is supplied to the limiter 31, changes according to the video information of the recording video signal. Hence, the video signal component of a large level which exceeds the limiting level of the limiter 31, is amplitude-limited to the limiting level. On the other hand, the video signal component of a small level which does not exceed the limiting level of the limiter 31, is obtained from the limiter 31 with the level unchanged. Generally, the video signal component which has no line correlation and is included within the reproduced video signal, has a large level compared to the level of the noise component within the reproduced video signal. For this reason, the limiting level of the limiter 31 is selected to a value so as to mainly extract the noise component within the reproduced video signal.

The video signal component obtained from the limiter 31, which has no line correlation and has a level under the limiting level of the limiter 31, is produced through a No. 15 pin of the IC 29. The signal produced through the No. 15 pin is passed through a capacitor C3, a parallel circuit which is made up of a capacitor C4 and a resistor R1, and a voltage dividing circuit which is made up of resistors R2 and R3 and divides the signal into two signals. One of the divided signals from the voltage dividing circuit, is supplied to a terminal P of a switching circuit 33. On the other hand, the other of the divided signals from the voltage dividing circuit is passed through a capacitor C6 and is supplied to a phase inverting circuit 32 wherein the phase of the signal is inverted. Further, an output signal of the phase inverting circuit 32 is passed through a capacitor C7 and is supplied to a terminal R of the switching circuit 33. At the time of the recording, the switching circuit 33, the switching circuits 26 and 28 described before, and —circuits 37 and 41, which will be described later on in the specification, are connected to the respective terminals R. Accordingly, the output signal of the phase inverting circuit 32 is selectively produced through the switching circuit 33, and this output signal is applied to a No. 19 pin of the IC 29 through a capacitor C8. The signal applied to the No. 19 pin is passed through a switching circuit 34 which is connected to a terminal 34a and is located within the IC 29, and is then supplied to a differential amplifier 35.

Figure 3:
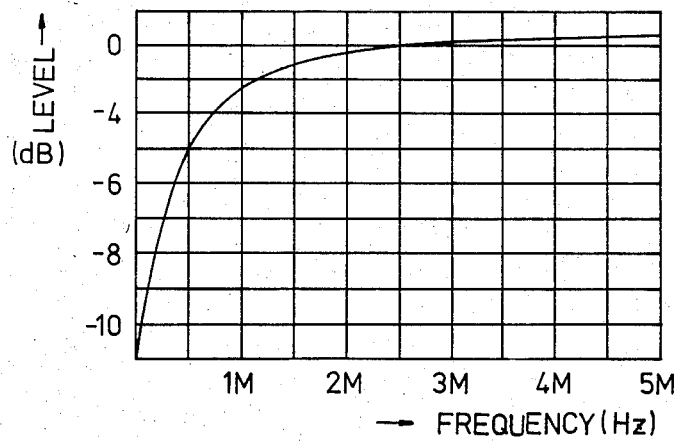
FIG. 3 is a graph showing an example of a frequency characteristic of an essential part of the circuit system shown in FIG. 2; and 19-conductor

The circuit which is made up of the capacitor C4 and the resistors R1 through R3, has a frequency characteristic shown in FIG. 3 when the capacitance of the capacitor C4 is selected to be 0.0012 μF and the resistances of the resistors R1 through R3 are respectively selected to be 1.2 kΩ, 68Ω, and 56Ω, for example. That is, the circuit has a highpass filter characteristic.

The switching circuit 34 and a switching circuit 47, which will be described later on in the specification, are designed so that the switching circuits 34 and 47 are connected to respective terminals 34b and 47b only for a duration in which a dropout detecting circuit 48 produces a dropout detection pulse. At the time of the recording and at the time of a normal reproduction, the switching circuits 34 and 47 are connected to respective terminals 34a and 47a. Thus, the video signal component which has no line correlation and is included within the recording video signal, is amplitude-limited and further phase-inverted before being supplied to one input terminal of the differential amplifier 35. At the same time, the recording video signal which is obtained through the No. 22 pin of the IC 29, is supplied to the other input terminal of the differential amplifier 35 through an amplifier 36. The differential amplifier 35 subjects the signals which are supplied to the two input terminals thereof, to a differential amplification. As a result, a video signal in which the recording video signal, and the video signal component which has no line correlation are added and mixed, is obtained at the output of the differential amplifier 35. The output video signal of the differential amplifier 35 is supplied to a No. 1 pin of the IC 29, through a collector of an NPN type transistor Q. The signal which is produced through the No. 1 pin is supplied to a frequency modulator 38, through the switching circuit 37 which is connected to the terminal R.

The frequency modulator 38 is supplied with the recording video signal in which the video signal component which has no line correlation is emphasized to a level which is approximately in the range of the limiting level of the limiter 31. The frequency modulator 38 frequency-modulates this recording video signal. An output frequency modulated video signal (FM video signal) of the frequency modulator 38 is supplied to rotary heads 43a and 43b, through an equalizer 39, a recording amplifier 40, the switching circuit 41, and rotary transformers 42a and 42b, as is well known. The rotary heads 43a and 43b alternately record the FM video signal onto a traveling magnetic tape 44 which is caused to travel by a known means.

Next, description will be given with respect to the operation of the apparatus at the time of the reproduction. At the time of the reproduction, the switching circuits 26, 28, 33, 37, and 41 are connected to respective terminals P. The recorded FM video signal on video tracks of the traveling magnetic tape 44 is alternately reproduced by the rotary heads 43a and 43b. The FM video signal which is reproduced by the rotary head 43a or 43b, is obtained through the rotary transformer 42a or 42b, the switching circuit 41, and a preamplifier 45. The reproduced FM video signals from the rotary heads 43a and 43b are formed into a continuous reproduced FM video signal in a switcher (not shown), which is thereafter supplied to an automatic gain control (AGC) circuit 46 wherein the amplitude deviation in the signal is corrected.

The reproduced FM video signal obtained through the AGC circuit 46 is supplied to the terminal 47a of the switching circuit 47 and to the dropout detecting circuit 48. At the same time, the reproduced FM video signal obtained through the AGC circuit 46 is also supplied to the 1H delay circuit 27 through the switching circuit 26. The dropout detecting circuit 48 produces a dropout detection pulse when an envelope level of the reproduced FM video signal falls below a predetermined level. The dropout detection pulse switches and connects the switching circuits 34 and 47 to the respective terminals 34b and 47b. On the other hand, the dropout detecting circuit 48 does not produce a dropout detection pulse when the envelope level of the reproduced FM video signal is greater than the predetermined level, and in this case, the switching circuits 34 and 47 are connected to the respective terminals 34a and 47a. Accordingly, at the time of the normal reproduction, the reproduced FM video signal is supplied to a frequency demodulator 49 wherein the reproduced FM video signal is frequency-demodulated into a reproduced video signal. The reproduced video signal from the frequency demodulator 49 is passed through the capacitor C2 and the No. 22 pin of the IC 29, and is supplied to the differential amplifier 30 and to the amplifier 36 within the IC 29.

The reproduced FM video signal which has been delayed by 1H in the 1H delay circuit 27, is supplied to a No. 5 pin of the IC 29, through a capacitor C9. The signal obtained through the No. 5 pin is passed through an amplifier 50 and a limiter 51, and is then supplied to a frequency demodulator 52. The 1H-delayed reproduced video signal which is obtained from the frequency demodulator 52, is produced through a No. 12 pin of the IC 29. This signal obtained through the No. 12 pin is passed through a filter circuit 53 which is made up of coils, capacitors, and resistors, a capacitor C10, the switching circuit 28, the capacitor C1, and the No. 21 pin of the IC 29, and is finally supplied to the differential amplifier 30 within the IC 29.

Accordingly, as a result of the differential amplification in the differential amplifier 30 between the reproduced video signal and the 1H-delayed reproduced video signal, a video signal which includes the noise component which originally has no line correlation and the video signal component which has no line correlation and was emphasized at the time of the recording, is obtained at the output of the differential amplifier 30. This output signal of the differential amplifier 30 is produced through the No. 18 pin of the IC 29, and is supplied to the limiter 31 within the IC 29 through the No. 16 pin. The limiter 31 limits the amplitude of the signal supplied thereto. As described before, the signal which is supplied to the limiter 31, includes the noise component which is mixed within the reproduced video signal and the video signal component which has no line correlation and is included within the reproduced video signal. Suppose that the level of the video signal component which has no line correlation and was originally included within the recording video signal is represented by $S_0$, and the level of the video signal component which has no line correlation and was obtained at the output of the limiter 31 at the time of the recording is represented by $\alpha \cdot S_0$, where $\alpha$ is less than 1. In this case, the level of the above reproduced video signal component which has no line correlation and is included in the signal which is supplied to the limiter 31, can be represented by $(1+\alpha)S_0$ which is the sum of the levels $S_0$ and $\alpha \cdot S_0$. When this reproduced video signal component which has no line correlation and has the level (b $1+\alpha)S_O$, is amplitude-limited in the limiter 31, the level of the video signal component which has no line correlation and is obtained at the output of the limiter 31 becomes approximately equal to $\alpha \cdot S_O$.

The reproduced video signal component which has no line correlation and is obtained at the output of the limiter 31, is passed through the No. 15 pin of the IC 29, the circuit part including the capacitors C3 and C4 and the resistors R1 through R3, the capacitor C5, the switching circuit 33, the capacitor C8, the No. 19 pin of the IC 29, and the switching circuit 34, and is finally supplied to one input terminal of the differential amplifier 35. On the other hand, the reproduced video signal 35 which is obtained from the frequency demodulator 49 and applied to the No. 22 pin of the IC 29, is supplied to the other input terminal of the differential amplifier 35 through the amplifier 36.

As a result, the differential amplifier 35 performs a subtraction and an amplification between the reproduced video signal from the amplifier 36 and the signal obtained through the switching circuit 34. As described before, the reproduced video signal from the amplifier 36 is a signal in which the video signal component which has no line correlation is emphasized to a level in the range of the limiting level of the limiter 31, and in which the noise component is mixed through the magnetic recording and reproducing process. Further, the signal which is obtained through the switching circuit 34, includes the video signal component which has no line correlation and has the level in the range of the level to which the emphasis was performed at the time of the recording, and the noise component. Consequently, the differential amplifier 35 produces a reproduced video signal in which the noise component within the input reproduced video signal applied to the No. 22 pin of the IC 29 has been cancelled and eliminated, and in which the video signal component which has no line correlation and was applied to the No. 22 pin is cancelled and eliminated to a level which is in the range of the level to which the emphasis was performed at the time of the recording, that is, to a level which is in the range of the limiting level of the limiter 31. In other words, the video signal component which has no line correlation is only eliminated to a level which is in the range of the level to which the emphasis was performed at the time of the recording, and the video signal component which has no line correlation and was originally included within the recording video signal is obtained through the differential amplifier 35 with the level thereof substantially unchanged.

As described heretofore, in the reproduced video signal which is obtained at the output of the differential amplifier 35, the level of the video signal component which has no line correlation is substantially unchanged from the level of the video signal component which has no line correlation and was included within the original recording video signal. Moreover, the noise component is substantially eliminated. This reproduced video signal from the differential amplifier 35 is supplied to a base of the transistor Q, and is further supplied to the switching circuit 37 through the No. 1 pin of the IC 29 through the collector of the transistor Q. Because the switching circuit 37 is connected to the terminal P at the time of the reproduction as described before, the reproduced video signal which is obtained through the No. 1 pin of the IC 29 is selectively supplied to an output terminal 54.

Thus, the operation of the apparatus is in principle the same as the conventional noise reduction circuit. In other words, the 1H delay circuit 27 corresponds to the 1H delay circuit 14 shown in FIG. 1, the differential amplifier 30 corresponds to the differential amplifier 13, the limiter 31 corresponds to the limiter 15, and the differential amplifier 35 corresponds to the mixer 16.

A commercially available IC chip, such as the chip AN6328S manufactured by Matsushita Electronics Corporation of Japan, may be employed for the IC 29. Further, the capacitances of the capacitors C0 through C10 are selected to be the following capacitances, for example.

C0=C5=C6=C7=C10=10 $\mu$F;
C1=C2=47 $\mu$F;
C3=C8=1 $\mu$F;
C4=0.0012 $\mu$F; and
C9=0.01 $\mu$F.

According to the present embodiment of the invention, only the video signal component which has no line correlation and was emphasized at the time of the recording, is eliminated at the time of the reproduction in the noise reduction circuit. Thus, compared to the output signal of the noise reduction circuit in the conventional apparatus, the reproduced video signal which is produced through the output terminal 54 includes more video signal component which has no line correlation. As a result, contours of the displayed contents in the reproduced picture which is obtained from the reproduced video signal, will become sharp and clear, and there is substantially no noise in the reproduced picture.

In the present embodiment, the IC 29 which is originally used for the noise reduction at the time of the reproduction, is also used at the time of the recording, and the circuit construction is simplified by this common use of the IC 29 at the time of the reproduction and at the time of the recording. In addition, the 1H delay circuit 27 is used as a circuit for the noise reduction, and is also used for compensating for the dropout in the reproduced video signal when the dropout occurs. When the dropout occurs, the switching circuit 47 is switched and connected to the terminal 47b by the dropout detection pulse which is produced from the dropout detecting circuit 48. Hence, the reproduced FM video signal which was obtained 1H before the dropout, is supplied to the frequency demodulator 49 from the 1H delay circuit 27. Therefore, when the dropout occurs, the reproduced video signal which is applied to the No. 22 pin of the IC 29 from the frequency demodulator 49, is substituted by the demodulated signal of the reproduced FM video signal which is obtained from the 1H delay circuit 27, that is, substituted by the demodulated signal of the reproduced FM video signal which is obtained 1H before the dropout.

In addition to using the 1H delay circuit 27 for the noise reduction circuit and for the circuit which compensates for the dropout in the reproduced video signal at the time of the reproduction, the same 1H delay circuit is also used at the time of the recording according to the present embodiment. As a result, the circuit construction is greatly simplified. Further, in a case where independent 1H delay circuits are used for the recording system and for the reproducing system, there will be a relative time difference between the 1H delay times which are used in the circuit, due to the slight differences in the 1H delay times of the independent 1H delay circuits. However, such a relative time difference will not occur according to the present embodiment, since the same 1H delay circuit is used in the recording system and in the reproducing system.

Figure 4:
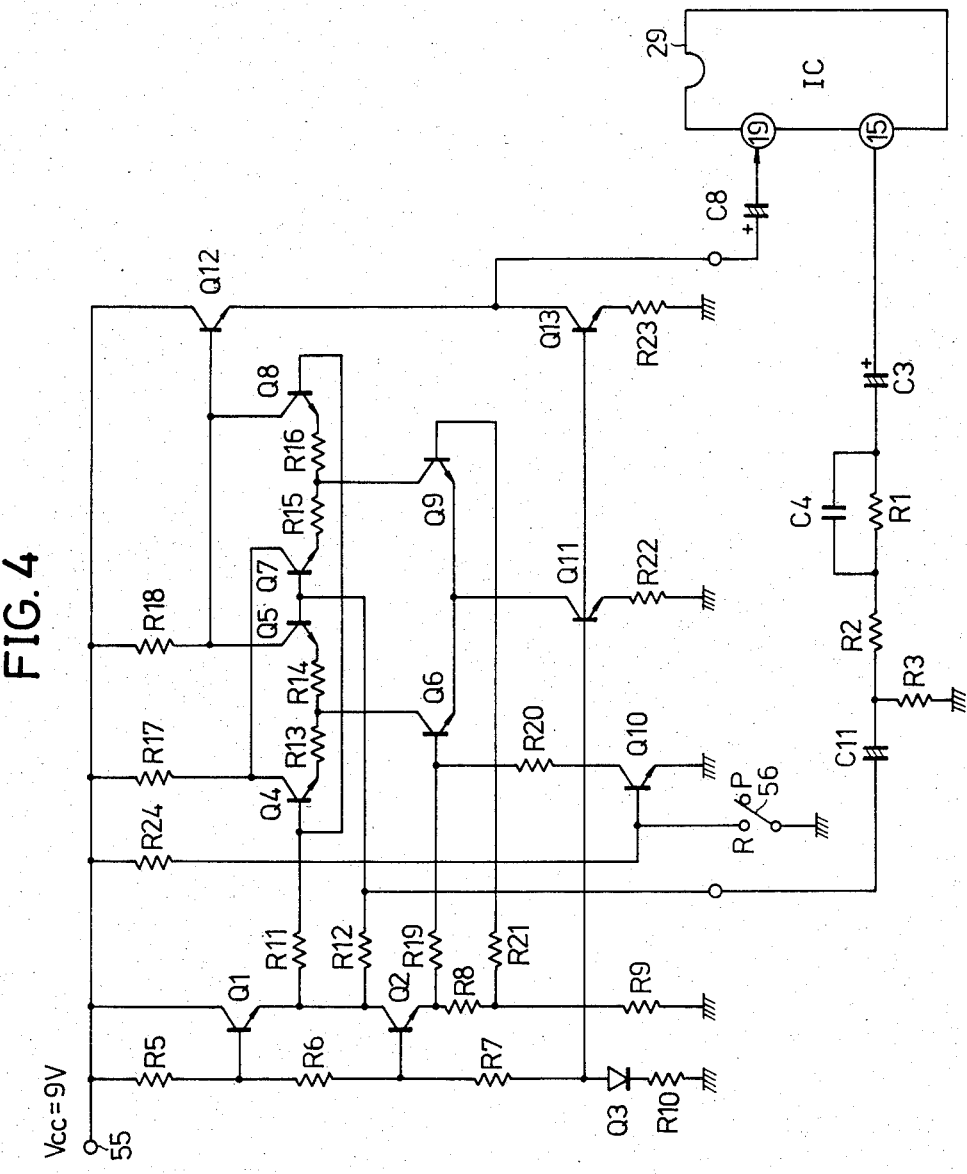
FIG. 4 is a circuit diagram showing an essential part of another embodiment of a video signal recording and reproducing apparatus according to the present invention.

Next, description will be given with respect to an essential part of another embodiment of a video signal recording and reproducing apparatus according to the present invention. FIG. 4 is a circuit diagram showing another embodiment of a circuit part between the No. 15 pin and the No. 19 pin of the IC 29. In FIG. 4, those parts which are the same as those corresponding parts in FIG. 2 are designated by the same reference numerals, and their description will be omitted. In FIG. 4, NPN type transistors Q1 and Q2 constitute a voltage source circuit together with resistors R5 through R9. An emitter of the transistor Q1 is coupled to respective bases of NPN type transistors Q4 and Q8, through a resistor R11. Further, the emitter of the transistor Q1 is coupled to respective bases of NPN type transistors Q5 and Q7, through a resistor R12. Emitters of the transistors Q4 and Q5 are commonly coupled to a collector of an NPN type transistor Q6, through respective emitter resistors R13 and R14, to constitute a first differential amplifier. On the other hand, emitters of the transistors Q7 and Q8 are commonly coupled to a collector of an NPN type transistor Q9, through respective emitter resistors R15 and R16, to constitute a second differential amplifier. Collectors of the transistors Q4 and Q7 are commonly coupled to a power source voltage input terminal 55, through a resistor R17. Collectors of the transistors Q5 and Q8 are commonly coupled to a base of an NPN type transistor Q12. Moreover, the collectors of the transistors Q5 and Q8 are also commonly coupled to the terminal 55 through a resistor R18.

A base of the transistor Q6 is coupled to a connection point between an emitter of the transistor Q2 and the resistor R8, through a resistor R19. The base of the transistor Q6 is also coupled to an NPN type switching transistor Q10, through a resistor R20. A base of the transistor Q9 is coupled to a connection point between the resistors R8 and R9, through a resistor R21. Emitters of the transistors Q6 and Q9 are commonly coupled to a collector of an NPN type transistor Q11. A base of this transistor Q11 is coupled to a base of an NPN type transistor Q13 and to an anode of a diode Q3. An emitter of the transistor Q11 is grounded through a resistor R22. An emitter of the transistor Q13 is grounded through a resistor R23, and a cathode of the diode Q3 is grounded through a resistor R10. Actually, an NPN type transistor which assumes a diode connection, is employed for the diode Q3.

Accordingly, the diode Q3, the transistors Q11 and Q13, and the resistors R10, R22, and R23 constitute a known current mirror circuit. Thus, a current which is equal to the current flowing to the anode of the diode Q3, flows to the collectors of the transistors Q11 and Q13. The transistor Q11, the diode Q3, and the like constitute a constant current source which is commonly used for the first and second differential amplifiers described before. A base of the transistor Q10 is coupled to a terminal R of a switch 56, and to the terminal 55 through a resistor R24. Further, a connection point between the resistors R2 and R3 is coupled to the respective bases of the transistors Q5 and Q7 through the capacitor C11.

Next, description will be given with respect to the operation of the circuit shown in FIG. 4. At the time of the recording, the switch 56 is connected to the terminal R. Thus, the base of the transistor Q10 is grounded through the switch 56 and is turned OFF. When the transistor Q10 is turned OFF, the base potential of the transistor Q6 becomes greater than the base potential of the transistor Q9, and for this reason, the transistor Q6 is turned ON and the transistor Q9 is turned OFF. Accordingly, the first differential amplifier, which is constituted by the transistors Q4 and Q5 and the like, is coupled to the transistor Q11 through the transistor Q6, and performs a differential amplifying operation. On the other hand, the second differential amplifier, which is constituted by the transistors Q7 and Q8 and the like, does not perform a differential amplifying operation, because no emitter current flows in the transistors Q7 and Q8. The video signal component which has no line correlation, is included within the recording video signal, is obtained through the No. 15 pin of the IC 29 shown in FIG. 2 and is supplied to the respective bases of the transistors Q5 and Q7, through a circuit part comprising the capacitors C3, C4, and C11 and the resistors R1 through R3. As described above, only the first differential amplifier operates in this state. Therefore, the video signal component which has no line correlation, is obtained through the collector of the transistor Q5 with an inverted phase. This video signal component obtained through the collector of the transistor Q5 is passed through the base and an emitter of the transistor Q12 which constitutes an emitter follower, and is supplied to the No. 19 pin of the IC 29 through the capacitor C8.

On the other hand, the switch 56 is connected to a dummy terminal P at the time of the reproduction. Accordingly, a positive power source voltage is applied to the base of the transistor Q10 through the resistor R24, and the transistor Q10 is turned ON. When the transistor Q10 is turned ON, the base potential of the transistor Q6 greatly decreases compared to the base potential of the transistor Q9. As a result, only the second differential amplifier operates, between the first and second differential amplifiers. Thus, the noise component and the reproduced video signal component within the reproduced video signal, which are obtained through the No. 15 pin of the IC 29, are obtained through the collector of the transistor Q8 with the phase unchanged. These signal components obtained through the collector of the transistor Q8, are passed through the base and the emitter of the transistor Q12, and are supplied to the No. 19 pin of the IC 29 through the capacitor C8.

For example, the resistances of the resistors R5 through R24 and the capacitance of the capacitor C11 are selected as follows.

R5=4.6 kΩ;
R6=5.8 kΩ;
R7=5.4 kΩ;
R8=1.2 kΩ;
R9=5.0 kΩ;
R10=1.4 kΩ;
R11=R12=10 kΩ;
R13=R14=R15=R16=400 Ω;046412474
R17=R18=1 kΩ;
R19=R21=20 kΩ;
R20=25 kΩ;
R22=R23=680 Ω;
R24=100 kΩ; and
C11=10 ΩF.

The present invention is not limited to the embodiments described heretofore. The differential amplifiers 30 and 35, the limiter 31, the 1H delay circuit 27, and the like may be provided independently in the recording system and in the reproducing system. However, it should be noted that the differential amplifier 35 must be designed to perform the adding and mixing operation and the differential amplifying operation at the time of the recording, as in the case of the embodiments described heretofore.

Further, the present invention is not limited to these embodiments, and various variations and modifications may be made without departing from the scope of the present invention.

What is claimed is:

1. A video signal recording and reproducing apparatus including a noise reduction circuit, said apparatus comprising:
   a frequency modulator for frequency-modulating a recording video signal which is to be recorded;
   recording means for recording an output frequency modulated recording video signal of said frequency modulator onto a recording medium;
   demodulating means including first means for reproducing the recorded frequency modulated video signal from the recording medium and second means for demodulating the reproduced frequency modulated video signal back into the original video signal;
   a noise reduction circuit for reducing a noise component in the output reproduced video signal of said demodulating means by pre-emphasizing portions of the video signal at the time of the recording and correspondingly de-emphasizing the pre-emphasized video signal portions at the time of the reproduction, said noise reduction circuit comprising a first delay circuit having a delay time of one horizontal scanning period for producing a delayed reproduced video signal from an output video signal of said first or second means of said demodulating means, a first differential amplifier supplied directly with the output reproduced video signal of said demodulating means and with the output delayed reproduced video signal of said first delay circuit, a first limiter for amplitude-limiting an output signal of said first differential amplifier, and a subtracting circuit for performing a subtraction between the output reproduced video signal of said demodulating means and an output signal of said first limiter;
   a second differential amplifier supplied directly with said recording video signal to one input terminal thereof;
   a second delay circuit for delaying said recording video signal by a delay time of one horizontal scanning period, and for supplying a delayed recording video signal to another input terminal of said second differential amplifier;
   a second limiter for amplitude-limiting an output video signal component of said second differential amplifier, to a limiting level which is approximately in the same range as a limiting level of said first limiter;
   an adding circuit for adding an output limited video signal component of said second limiter to said recording video signal, a common differential amplifier being used as said first and second differential amplifiers, a common delay circuit being used as said first and second delay circuits, a common limiter being used as said first and second limiters; and
   circuit means for selectively supplying the output limited video signal component of said common limiter to said subtracting circuit with the phase thereof inverted at the time of the recording, and for selectively supplying the output signal of said common limiter to said subtracting circuit with the phase thereof unchanged at the time of the reproduction, so that said subtracting circuit can also be used as said adding circuit.

2. An apparatus as claimed in claim 1 which further comprises a circuit having a highpass filter characteristic located in a signal transmission patch between said second limiter and said adding circuit.

3. An apparatus as claimed in claim 1 in which said circuit means comprises a constant current source, a third differential amplifier coupled to said constant current source through a first switching element, a fourth differential amplifier coupled to said constant current source through a second switching element, means for supplying the output limited video signal component of said second limiter to respective input terminals of said third and fourth differential amplifiers at the time of the recording, and for supplying the output signal of said first limiter to the respective input terminals of said third and fourth differential amplifiers at the time of the reproduction, output means for obtaining an input signal of said third differential amplifier with the phase thereof inverted and for obtaining an input signal of said fourth differential amplifier with the phase thereof unchanged, and switching means for turning ON only said first switching element between said first and second switching elements and for operating only said third differential amplifier at the time of the recording so that said output means obtains the output limited video signal component of said second limiter with the phase thereof inverted, and for turning ON only said second switching element and for operating only said fourth differential amplifier at the time of the reproduction so that said output means obtains the output signal of said first limiter with the phase thereof unchanged.

* * * * *